United States Patent [19]

Robotti et al.

[11] Patent Number: 4,581,931

[45] Date of Patent: Apr. 15, 1986

[54] DIFFERENTIAL LEVEL-MONITORING FLOAT DEVICE

[75] Inventors: Franco Robotti; Tommaso Rossini, both of Segrate, Italy

[73] Assignees: CISE-Centro Informazioni Studi Esperienze S.p.A., Milan; S.I.S. Geotecnica s.r.l., Segrate, both of Italy

[21] Appl. No.: 617,913

[22] Filed: Jun. 6, 1984

Related U.S. Application Data

[63] Continuation-in-part of Ser. No. 342,023, Jan. 22, 1982, abandoned.

[30] Foreign Application Priority Data

Jan. 29, 1981 [IT] Italy ................ 19403 A/81

[51] Int. Cl.[4] .................................... G01F 23/06
[52] U.S. Cl. ............................. 73/311; 33/367
[58] Field of Search ............ 73/290 R, 291, 292, 73/301, 302, 308, 309, 311, 313, 314; 33/367, 366

[56] References Cited

U.S. PATENT DOCUMENTS

| | | | |
|---|---|---|---|
| 2,025,774 | 12/1935 | Rennick et al. | 73/311 |
| 2,704,342 | 3/1955 | Fielden | 73/313 |
| 2,791,119 | 5/1957 | Zinn et al. | 73/301 |
| 2,911,828 | 11/1959 | Keating et al. | 73/309 X |
| 3,138,024 | 6/1964 | Pariser et al. | 73/308 |
| 3,216,255 | 11/1965 | McFarlane | 73/313 |
| 3,949,484 | 4/1976 | Cluley et al. | 33/367 |
| 4,080,828 | 3/1978 | Akita et al. | 73/313 |
| 4,364,270 | 12/1982 | Heinzl et al. | 73/301 |
| 4,397,099 | 8/1983 | Gaucher et al. | 33/365 |

FOREIGN PATENT DOCUMENTS

| | | | |
|---|---|---|---|
| 2944433 | 5/1981 | Fed. Rep. of Germany | 73/313 |
| 103325 | 8/1981 | Japan | 73/290 R |
| 97410 | 6/1982 | Japan | 73/290 R |
| 2011627 | 7/1979 | United Kingdom . | |
| 220953 | 9/1968 | U.S.S.R. | 73/313 |

Primary Examiner—Stewart J. Levy
Assistant Examiner—Hezron E. Williams
Attorney, Agent, or Firm—Sheridan Neimark; A. Fred Starobin; Karl W. Flocks

[57] ABSTRACT

A high-sensitivity device for measuring the mutual level differentials among a certain number of reading locations, the device comprising a plurality of containers, one for each reading location, mutually connected at the bottom ends by a piping opening into a balancing tank which holds a liquid mass. Each container is equipped in its interior with a float which is held spaced apart from the container walls by flexible retaining members, a level-differential sensitive transducer being mounted in correspondence with the walls. The apparatus further comprises a device for measuring the signals delivered by the transducers.

10 Claims, 3 Drawing Figures

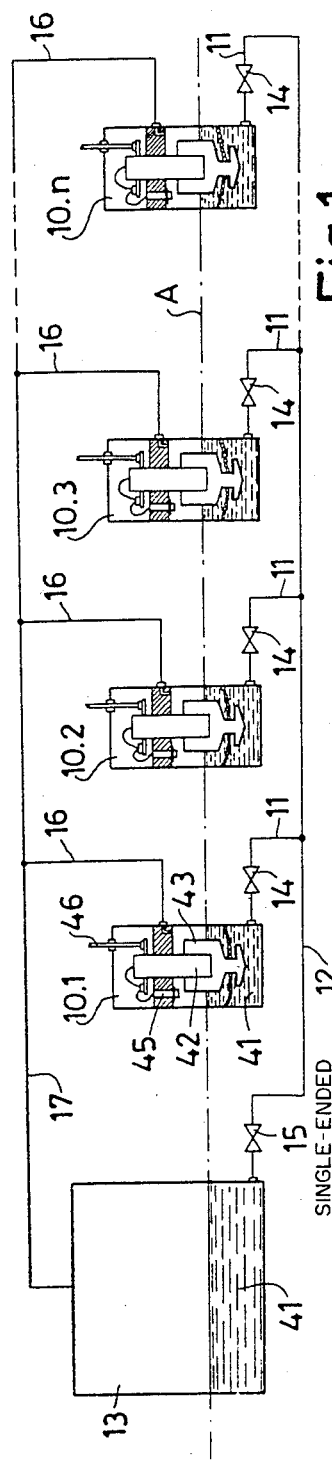
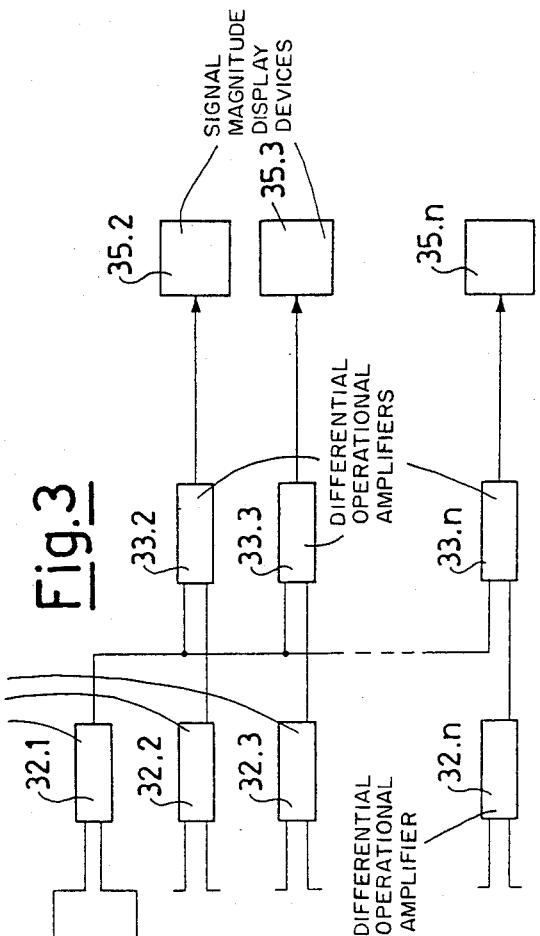
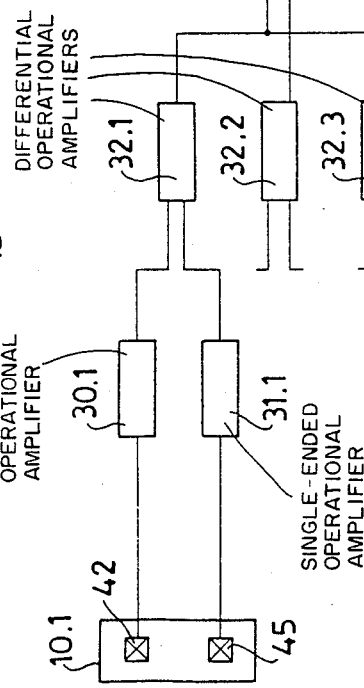

DIFFERENTIAL LEVEL-MONITORING FLOAT DEVICE

BACKGROUND OF THE INVENTION

This application is a continuation-in-part of the application Ser. No. 342,023 of Franco Robotti and Rommaso Rossini, filed Jan. 22, 1982, now abandoned and entitled "Differential Level-Monitoring Float Devices".

The invention relates to a highly sensitive device for measuring the level of differentials among a certain number of reading locations.

More particularly, this invention relates to those level-differential metering devices which are essentially comprised of a plurality of containers, each of them being placed in correspondence with a reading location, each container being interconnected to the others by a piping which opens into a liquid-holding balancing tank. Each container is equipped with a transducer which is responsive to the liquid level in the container concerned and is capable of delivering a signal, which is a function of the level attained by the free liquid surface, said signal, properly processed with a signal of a transducer of a reference container, giving the level in the container concerned relative to the level in the reference container.

Devices of the kind referred to above have a number of practical uses, among which are subsidence of foundations; measurements of the slope of towers, lattice structures, memorials, dams, and bridges; measurement of the level differentials between the supporting members of machines and installations such as bearings, large pipelines and so forth.

The devices of the kind referred to above, as used nowadays, have, however, certain defects which are connected with the inescapable necessity of using mercury rather than other liquids as the liquid medium, the electric properties of mercury being in good agreement with the proximity transducers now used.

Mercury, however, is a strongly polluting agent and is thus dangerous. In addition, its high cost has a bearing on the final cost of the apparatus.

Other cheaper and less polluting liquids have not the electric properties which would permit the use of proximity transducers of the type used in the present invention to sense the level of their free surface.

SUMMARY OF THE INVENTION

An object of the present invention is to do away with the drawbacks of the conventional art as outlined above, by suggesting an apparatus for the differential measurement of levels, which can employ, for its operation, any kind of liquid.

In order that such an object may be achieved, it has been envisaged to provide an apparatus for the differential measurement of levels, of the kind comprising a plurality of containers which are mutually interconnected at their bottoms by a piping which opens into a liquid-holding balancing tank, characterized in that each container is equipped in its interior with a float buoyant in the liquid, said float being retained in a position spaced apart from the inner container walls by flexible members which connect them to said walls, there being mounted, in correspondence with such a buoyant body and integrally with the container, a transducer which is responsive to the liquid level, means being further provided for measuring the signals delivered by the transducers.

BRIEF DESCRIPTION OF THE DRAWINGS

In order that the features and advantages of the invention may better be understood, a description will be given hereinafter of an exemplary embodiment thereof, illustrated in the accompanying drawings, wherein:

FIG. 1 is an overall diagrammatical showing of the device;

FIG. 3 is a block diagram of the system for processing the signals delivered by the device of FIG. 1.

DETAILED DESCRIPTION OF A PREFERRED EMBODIMENT

Figure 2:
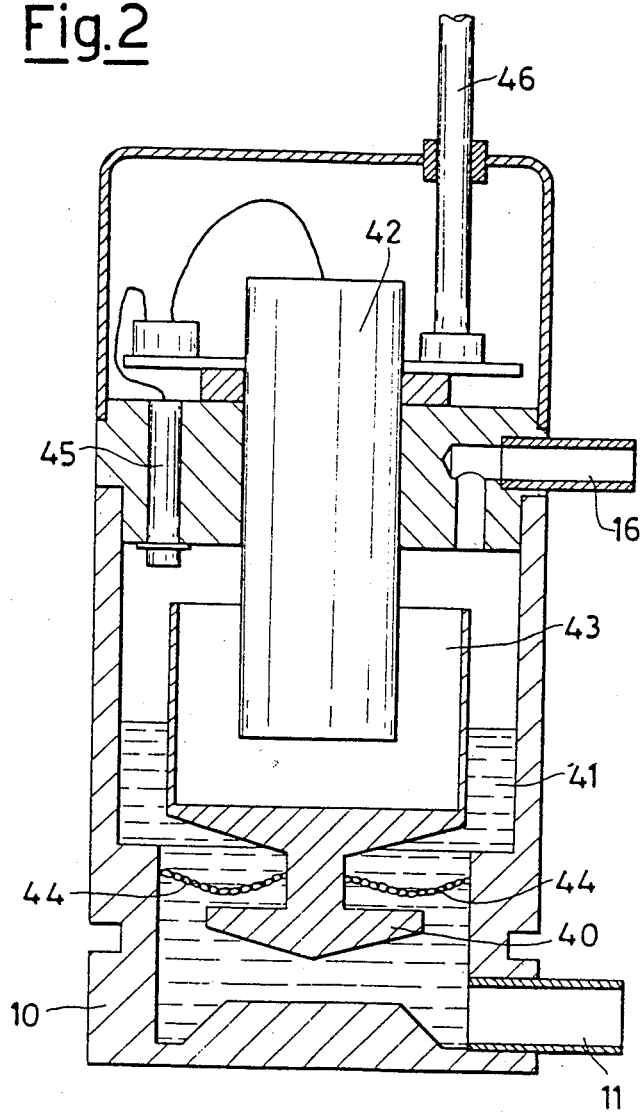
FIG. 2 is a detailed cross-sectional view of one of the containers shown in FIG. 1.

As shown in FIG. 1, the device is composed, according to a conventional layout, of containers, 10.1, 10.2, 10.3 ... 10.n which communicate mutually, at their bottoms, through branch-offs 11 with a common duct 12 which opens into a balancing tank 13. Each branch-off 11 has a cutoff valve 14, of its own, and the duct 12 has a similar cutoff valve 15.

The top sections of the containers 10 are interconnected by branch-offs 16 of a single pipeline 17, the latter communicating also with the tank 13 in the top portion thereof.

The containers 10 and tank 13 are partially filled with a liquid 41 which stabilizes itself therein at a level, common to all of them, as indicated by the horizontal line A, according to the well known principle of the communicating tubes.

According to the invention, in each container 10 a member 40 is provided, which floats in the liquid 41, and above which there is secured, integrally with container 10, a proximity transducer 42, which delivers an electric signal proportional to the level of the body of member 40 in container 10. Proximity transducer 42 is of the type having a high frequency coil encapsulated therein. This coil radiates the high frequency signal into the hollow space 43 which signal, as a magnetic field, encounters a target 47. Target 47 is either along with member 40 made of metal, or metal coated, or a metal disk in the base of the cup shaped portion of member 40, so as to present a conductive surface to the magnetic field. As member 40 is raised or lowered by changes in levels of liquid 41, and conductive surface 47 moves relative to the coil in transducer 42, eddy currents are induced in target 47. Through absorption of radiated energy, the movement of the surface of target 47 relative to transducer 42 causes the output signal of transducer 42 to vary in direct proportion to changes in the resulting gap.

As shown in FIG. 2, member 40 has a substantially cup-shaped configuration and its hollow space 43 partially houses transducer 42. Float member 50 which is goblet or cup-shaped permits reduction of the longitudinal dimensions of the container-transducer sensor group as shown in FIG. 2. This is accomplished because the horizontal inside surface of target 47 can be positioned at a lower level than the free surface of liquid 41 in container 10. As shown in FIG. 2 even lower end of transducer 42 may be positioned below the free surface liquid level. The lower extension in the goblet form lowers the center of gravity for floating member 40 thus further stabilizing it in liquid 41. The reduction in dimensions of the container-transducer sensor group is very important when container 10 must be positioned in a narrow or small space.

In addition, member 40 is held within container 10 in a central position by small chains 44 immersed in liquid 41. These are anchored at either end to container 10 whereas they are secured at the other end to member 40 by fastening means placed at a level which is nearly horizontal to their connection to the walls of container 10. The use of chains 44 instead of some other centering means, such as, for example, springs as in prior art is essential for accurate operation of the device of the present invention. Chains 44 oppose the vertical movement of the floating member 40 with a force proportional to the vertical displacement of floating member 40 itself. The proportionality constant is given by the projection of the load per length unit of the used chain on the vertical plane. This is true for a very wide swing limited only by the chain length. This is advantageous over prior art centering means such as the aforementioned springs since a spring anchoring system may oppose a float vertical displacement with a behavior determined by the tangent of the spring inclination angle, such angle determined by the ratio between the float displacement wideness and the spring length. Thus, if chains are used, the error between liquid level variation and float displacement has a linear behavior which linear error is automatically compensated by calibrating the output signal of transducer 42.

A temperature sensor 45 is also provided in container 10 since temperature, and then liquid density, differences normally found among various measurement positions at which containers 10 are located, would give rise to liquid level variations in containers 10 and thus to measurement errors with respect to vertical base displacements. Therefore, in the system of the present invention every container has a temperature sensor 45 used to compensate for errors from thermal sources at the measurement positions.

The signals delivered by transducers 42 and sensors 45 from each of containers 10 are processed according to a conventional pattern which is exemplified in FIG. 3 to complete the present disclosure.

The level signal delivered by a transducer 42 is sent to a single ended operational amplified 30.1, wherefrom an electric signal in differential operational amplifier 32.1 is fed the voltage which is proportional to the level of member 40 as sensed by transducer 42.

The temperature signal delivered by sensor 45 is similarly fed to single-ended operational amplifier 31.1 wherefrom a signal is delivered, which is a function of the temperature differential in the container relative to a reference temperature. At differential operational amplifier 32.1, the level signal is corrected with the temperature signal to prevent variations of the liquid density due to the effect of the temperature from influencing the readings.

Each container such as 10.1, 10.2, . . . 10.n has, associated therewith, the attendant amplifier units such as 30.1, respectively, and each of which pairs connect to a respective amplifier 32.1, 32.2, . . . 32.n, respectively, so that there will be a signal delivered by one of amplifiers 32.1, 32.2, 32.3, . . . 32.n for each of containers 10.1, 10.2, 10.3, . . 10.n, respectively.

One of the containers, which is assumed here to be 10.1, has a reference function since the device is adapted to effect differential measurements, and the signal delivered by differential operational amplifier 32.1 acts like a reference signal and is fed to differential operational amplifiers 33.2, 33.3, . . . 33.n. The signal delivered by amplifier 32.2 is fed to the amplifier 33.2 wherein the difference is calculated with the signal coming from amplifier 32.1, so that the signal existing amplifier 33.2 is the level of the container 10.2 relative to the container 10.1.

Quite in the same way, a signal is delivered by amplifier 33.3 as to the level of the container 10.3 relative to 10.1 and so forth.

The $(n-1)$ signals which represent the levels of the containers 10 relative to any of them are received by devices 35.2, 35.3, . . 35.n which display the magnitude, more particularly of the voltage of the signal.

For visual display one should intend the widest acceptance of the word since the term may comprise any means for measuring the signal, directly reading the measure, its recordal and otherwise.

In actual practice, the operation is simplicity itself.

Whenever a container undergoes a level variation relative to the reference container 10.1, the relative level of the liquid 41 held therein is varied. As a result, the floating member 40 is vertically shifted and the transducer 42 announces this shift and enables an operator, according to what has been explained above, to have a quantitative appreciation of the relative displacement of the container concerned.

The floating member 40 acts as a movable target for the transducer 42 and, for this reason, it is a metallic body, or metal coated, at least on the surface of target 47. Its centering is obtained, as outlined above, by means of small chains 44, which permit the free vertical displacements of floating member 40 and locate it to occupy a constantly centered radial position. This is obtained without any contact between surfaces (guides or otherwise) and thus without any friction or adhesion forces which, even if of a slight magnitude, would cause hysteresis in the motion of the floater relative to the fluid level variations.

The centering thus achieved is the effect of an equilibrium of forces from opposing attached chains stemming from the reactions originated at the chain ends by virtue of their weight, even taking into account the loss of weight due to their immersion in liquid.

The floating member 40 must have a geometrical configuration capable of providing the following conditions:

(a) The center of gravity must be as low as possible relative to the metacenter so as to ensure a correct vertical position of the axis of the floating member.

(b) The immersed surfaces must be properly shaped so as to prevent air bubbles from adhering thereto which would thus cause instability of the floating level.

(c) The surfaces above the liquid level shall be so shaped as not to retain any droplets due to possible condensation of the liquid vapors.

(d) The points at which the small chains are fastened must be as close as possible to the center of gravity.

(e) The weight of the small chains must be such as to reduce the variations of the vertical component of the end reaction in the different vertical positions of the floating member, relative to the weight of the member itself.

The use of the floating member 40 permits a selection of the liquid having the most suitable properties so that the nature of the liquid is no longer bound to the requirements of the transducer.

The containers 10, preferably made of a metallic material, must have a sufficiently wide diameter so as to remove errors due to the superficial tension of liquid 41. From each container a tube 46 emerges, through which the leads run which carry the electric signals which have been processed and come from transducer 42 and temperature sensor 45.

The stages of assemblage, check and calibration of the device are not described herein since they are carried out conventionally by using in the appropriate way the component parts described above.

The present exemplary embodiment is by no means a bar against possible changes and/or additions. More particularly, the shape of the floating member 40 can be varied, provided that it is compliant with the required characteristics.

What is claimed is:

1. A device for measuring level differentials of the kind comprising
   a plurality of containers,
   piping means to mutually interconnect said containers at their bottoms,
   a liquid in said containers and said piping,
   each of said containers having a member floating in said liquid,
   said floating member located in the interior of said container in a position spaced away from inner walls of said container,
   a flexible means to fasten said floating member to said inner walls of said container,
   a target,
   a proximity transducer of the type having a coil therein and a signal radiated axially toward said target from said coil, mounted integrally with said container,
   said floating member including said target of a conductive plate form having a conductive surface transverse of the axial axis of said coil and spaced along this axis from said coil, changing its distance along said axis with changes in the level of said liquid in said container,
   and means to receive and measure signals from each of said transducers in each of said containers.

2. The device of claim 1 further characterized by
   said floating member having a substantially cup-shaped configuration shaped to receive an end of said proximity transducer within a dished portion of said cup-shaped configuration.

3. The device of claim 2 further characterized by
   said proximity transducer having a lower end extending to a level lower than the free surface of said liquid in said container and into said dished portion of said cup-shaped configuration.

4. The device of claim 1 further characterized by
   said containers having mutual interconnection at their top portions by ducting means to maintain a constant and common fluid gas pressure in their upper portions.

5. The device of claim 1 further characterized by
   said containers each having temperature sensor means to deliver an electric signal to correct a signal received from said transducer in said container to correct the level measure from said container by referring it to a temperature corresponding to a preselected liquid density.

6. The device of claim 1 further characterized by
   said means for measuring signals including p2 comparision circuits for comparing a signal received from one of said containers used as a reference signal with signals received from others of said containers so as to produce electric signals which are a function of the level differential of said floating members in said others of said containers relative to the level of said floating member in said container from which said reference signal is received.

7. The device of claim 2 further characterized by
   said floating member having an extension means extending below said cup-shaped configuration to lower the center of gravity of said floating member and stabilize said floating member.

8. A device for measuring level differentials of the kind comprising
   a plurality of containers,
   piping means to mutually interconnect said containers at their bottoms,
   a liquid in said containers and said piping,
   each of said containers having a member floating in said liquid,
   said floating member located in the interior of said container in a position spaced away from inner walls of said container,
   a flexible means to fasten said floating member to said inner walls of said container,
   said flexible means being slack, attached chains of sufficient length to have a curvature between ends, allowing easy vertical movement of said floating member,
   a proximity transducer of the type having a coil therein and a signal radiated from said coil, mounted integrally with said container,
   said floating member including a target of a conductive plate form having a conductive surface transverse of the axial axis of said coil and spaced along this axis from said coil, changing its distance along said axis with changes in the level of said liquid in said container,
   and means to receive and measure signals from each of said transducers in each of said containers.

9. The device of claim 8 further characterized by
   said chains anchored to said floating member in the vicinity of the center of gravity of said floating member.

10. The device of claim 9 further characterized by
    said chains anchored to said inner walls of said containers at positions substantially horizontal to their positions of anchoring to said floating member.

* * * * *